(12) United States Patent
Girini et al.

(10) Patent No.: US 6,918,468 B2
(45) Date of Patent: Jul. 19, 2005

(54) AUTOMATIC DRUM BRAKE ADJUSTER LOCKED AT A HIGH TEMPERATURE

(75) Inventors: Adriano Girini, Cairo Montenotte (IT); Luigi Tessitore, Savona (IT); David Peasley, Balsall Common (GB)

(73) Assignee: Automotive Products Group Limited, Leamington Spa (GB)

( * ) Notice: Subject to any disclaimer, the term of this patent is extended or adjusted under 35 U.S.C. 154(b) by 0 days.

(21) Appl. No.: 10/416,912

(22) PCT Filed: Sep. 12, 2002

(86) PCT No.: PCT/GB02/04155

§ 371 (c)(1),
(2), (4) Date: Sep. 8, 2003

(87) PCT Pub. No.: WO03/025415

PCT Pub. Date: Mar. 27, 2003

(65) Prior Publication Data

US 2004/0069577 A1 Apr. 15, 2004

(30) Foreign Application Priority Data

Sep. 18, 2001 (GB) .............................. 0122436

(51) Int. Cl.⁷ ........................ F16D 65/56; F16D 51/00
(52) U.S. Cl. ........................ 188/79.52; 188/196 BA
(58) Field of Search .................. 188/79.52, 79.51, 188/79.54, 79.55, 79.56, 196 B, 196 BA

(56) References Cited

U.S. PATENT DOCUMENTS 2,345,108 A * 3/1944 Goepfrich ............... 188/79.52
4,706,784 A * 11/1987 Shellhause ............. 188/79.52
4,729,457 A * 3/1988 Cousin et al. .......... 188/79.52
6,328,141 B1 * 12/2001 Asai et al. .............. 188/79.52
6,397,984 B1 * 6/2002 De Andreis et al. ..... 188/79.52
2003/0226729 A1 * 12/2003 Ohnishi et al. ............ 188/342

FOREIGN PATENT DOCUMENTS

| EP | 538909 A2 | * | 4/1993 | ........... F16D/65/56 |
| EP | 869292 A1 | * | 10/1998 | ........... F16D/65/56 |
| EP | 1355077 A1 | * | 10/2003 | ........... F16D/65/56 |
| GB | 2226610 A | * | 7/1990 | ........... F16D/65/56 |
| WO | WO 0101008 A1 | * | 1/2001 | ........... F16D/65/56 |

* cited by examiner

*Primary Examiner*—Thomas Williams
(74) *Attorney, Agent, or Firm*—Paul E Milliken; Ray L Weber

(57) ABSTRACT

A brake adjuster for adjusting the working clearance of the shoes of an automotive drum brake, the adjuster including three co-axial elements a first rod element (25) having a head portion for engagement with a first brake shoe and a threaded stem portion, an intermediate element (28) in threaded engagement with the first rod element and a second rod element (27) having a head portion for engagement with a second brake shoe and a stem portion slideably connected with the intermediate element (28) and free to rotate relative thereto. A reaction member (30) is mounted on the intermediate element (28) and a ring gear (35) is provided on the intermediate element which is axially located between the second rod element and the reaction member. A leaf spring (31) acts between the second rod element (27) and the reaction member (30) for pushing the second rod element away from the intermediate element (28). This leaf spring carries a bi-metallic pawl (31) which is either formed integrally with the leaf spring or is secured around the spring so that during a normal operation the pawl engages the ring gear (35) to operate the adjuster and at temperatures above a pre-set value the pawl is deflected out of engagement with the ring gear to prevent adjustment.

1 Claim, 4 Drawing Sheets

AUTOMATIC DRUM BRAKE ADJUSTER LOCKED AT A HIGH TEMPERATURE

This invention relates to brake adjusters which automatically adjust the working clearance of a brake shoe in automotive drum brake.

It is well known that brake drum expansion may lead to excessive adjustment of brake clearances when the brake is hot and that when the brake cools all the brake shoe clearance may disappear and the brake shoe may become locked against the associated drum.

European patent EP-B-0538909 claims a brake adjuster which is fitted with a temperature sensitive device which prevents adjustment of the associated brake at high temperatures. The temperature sensitive device described in EP-B-0538909 is relatively complex and difficult to manufacture.

It is an object of this invention to provide an improved form of automatic adjuster which is less expensive to produce.

Thus according to a first aspect of the present invention there is provided a brake adjuster for adjusting the working clearance of the shoes of an automotive drum brake, the adjuster including three co-axial elements:

a first rod element having a head portion for engagement with a first brake shoe and a threaded stem portion;

an intermediate element in threaded engagement with the first rod element;

a second rod element having a head portion for engagement with a second brake shoe and a stem portion slideably connected with the intermediate element and free to rotate relative thereto;

a reaction member mounted on the intermediate element;

a ring gear for rotation with the intermediate element and axially located between the second rod element and the reaction member;

a leaf spring acting between the second rod element and the reaction member for pushing the second rod element away from the intermediate element, said leaf spring carrying a pawl designed to engage the ring gear, and a temperature sensitive mechanism designed to prevent the ring gear rotating when the brake temperature exceeds a pre-set value;

the adjuster being characterised in that the temperature sensitive mechanism is provided by forming either the leaf spring as a bimetallic member or the pawl as a bimetallic member formed integrally on the spring or secured around the spring so that during a normal operation the pawl engages the ring gear to operate the adjuster and at temperatures above a pre-set value the pawl is deflected out of engagement with the ring gear to prevent adjustment.

Various alternative constructions are possible. For example, the leaf spring may be formed from a first metal and the pawl which projects from the leaf spring as an integral part thereof may also be formed from the first metal and from a second metal laminated onto the first metal to provide the bi-metal function.

Alternatively the leaf spring may be formed as a bi-metal lamination of first and second metals and the pawl which is integral with the spring and projects therefrom may be formed from the first metal only. In such an arrangement the deflection of the pawl out of engagement with the ring gear occurs as a result of changing curvature of the leaf spring.

In a further alternative both the leaf spring and the integral pawl may both be formed from a bi-metal laminate of first and second metals with both the leaf spring and pawl being deflected as a result of changes in temperature.

In a further form of the invention, when the pawl is formed from a bi-metal laminate which is secured around the spring, the pawl may have formations which engage co-operating locating formations on the spring such as flaps on the pawl which may be folded around the edges of the spring and which may engage recesses formed in the edges of the spring.

The present invention will now be described with reference to the accompanying drawings in which.

Figure 1:
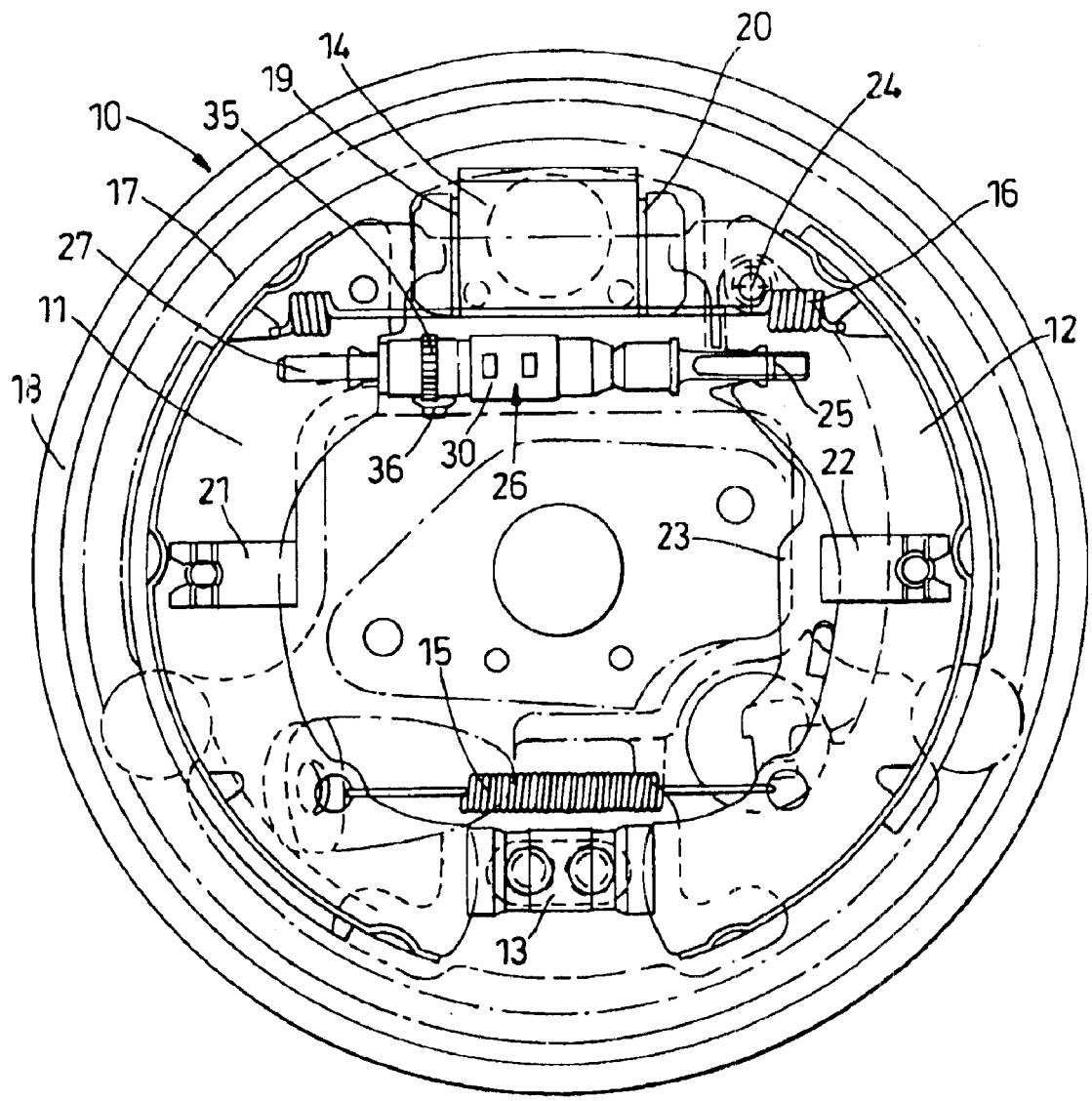
FIG. 1 is a side view of a vehicle drum brake including a brake adjuster embodying the present invention.
Figure 2:
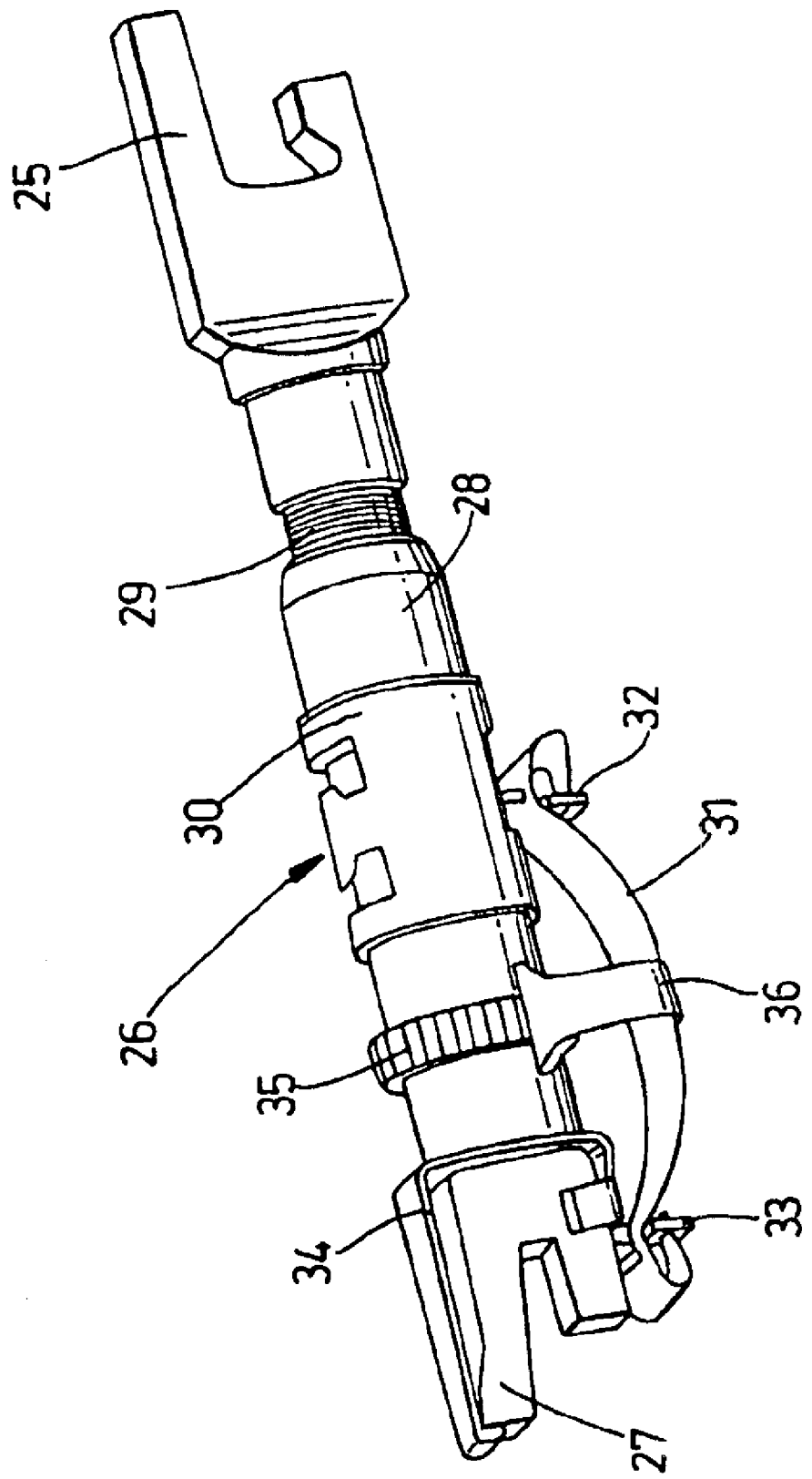
FIG. 2 is a perspective view of the brake adjuster used in FIG. 1.

Referring to FIG. 1 this shows a drum brake 10 having a pair of brake shoes 11,12 which at their lower ends react against a fixed abutment 13 and at their upper ends are forced apart by an hydraulic wheel cylinder 14. The shoes are kept in contact with the abutment 13 by a lower return spring 15 and in contact with the wheel cylinder 14 by an upper return spring 16.

Thus during normal service operation the shoes are brought into contact with the inner surface 17 of brake drum 18 in the conventional manner by actuating wheel cylinder 14 whose pistons 19 and 20 respectively outwardly displace the contacting ends of shoes 11 and 12 to engage the drum. In the conventional manner the two shoes are held down by hold down clips 21 and 22 respectively. The drum brake is also provided with a handbrake operating lever 23 pivoted at 24 on brake shoe 12. The hand brake operating lever contacts the right hand bead portion 25 of an adjuster strut 26 whose left hand head portion 27 contacts the other brake shoe 11. In conventional manner if, for example, the handbrake lever 23 is pivoted on pivot 24 in a clockwise sense as viewed in FIG. 1 the handbrake lever will push the right hand head portion 25 of adjuster strut 26 to the left thus pushing the brake shoe 11 to the left. This in effect causes the two brake shoes 11 and 12 to move apart relative to each other and hence again engage the inner surface 17 of the brake drum 18 thus applying the hand brake.

The adjuster strut 26 basically comprises three components. The right hand head portion 25, the left hand head portion 27 and an intermediate element 28. The right hand head portion 25 has a threaded stem portion 29 which is received in a screw threaded bore in the right hand end of intermediate element 28. Similarly the left hand head portion 27 has a stem portion which is axially slideable within an internal bore in the left hand bend of intermediate element 28. A sheet metal reaction member 30 surrounds the intermediate element 28 and is axially located relative thereto. A bow spring 31 reacts at one end on an abutment 32 provided on the reaction member 30 and at its other end on an abutment 33 provided on a clip like reaction member 34 mounted on the stem portion of left hand head portion 27. A gear wheel 35 formed on intermediate element 28 is engaged by a pawl 36 which forms part of bow spring 31.

Bow spring 31 biases left hand head portion 27 to the left relative to the intermediate element 28. The effect of this is that when the left hand end portion 27 is moved into the bore in the intermediate member when the brake shoes are retracted by the springs 15 and 16 this causes the bow spring 31 to assume a more bowed configuration so that the pawl 36 tends to be drawn up out of engagement with the gear wheel tooth 35 which is it is currently engaging. When the amount of movement of the left hand head portion relative to the right hand portion exceeds a predetermined level (indicating a predetermined amount of retraction of the brake shoes which in turn indicates a predetermined amount of wear) then the pawl will engage the next tooth and gear wheel 35 and when the brake is next applied the energy stored in the bowed spring rotates the intermediate element 28 slightly relative to the right hand head portion 25 to increase the effective length of the adjuster strut 26 to take up the wear.

Thus far described the adjuster strut is of known type.

In accordance with the present invention a temperature sensitive mechanism is provided to ensure disengagement of the pawl 36 from the gear wall 35 at high temperatures to prevent over adjustment of the drum brake.

Figure 3:
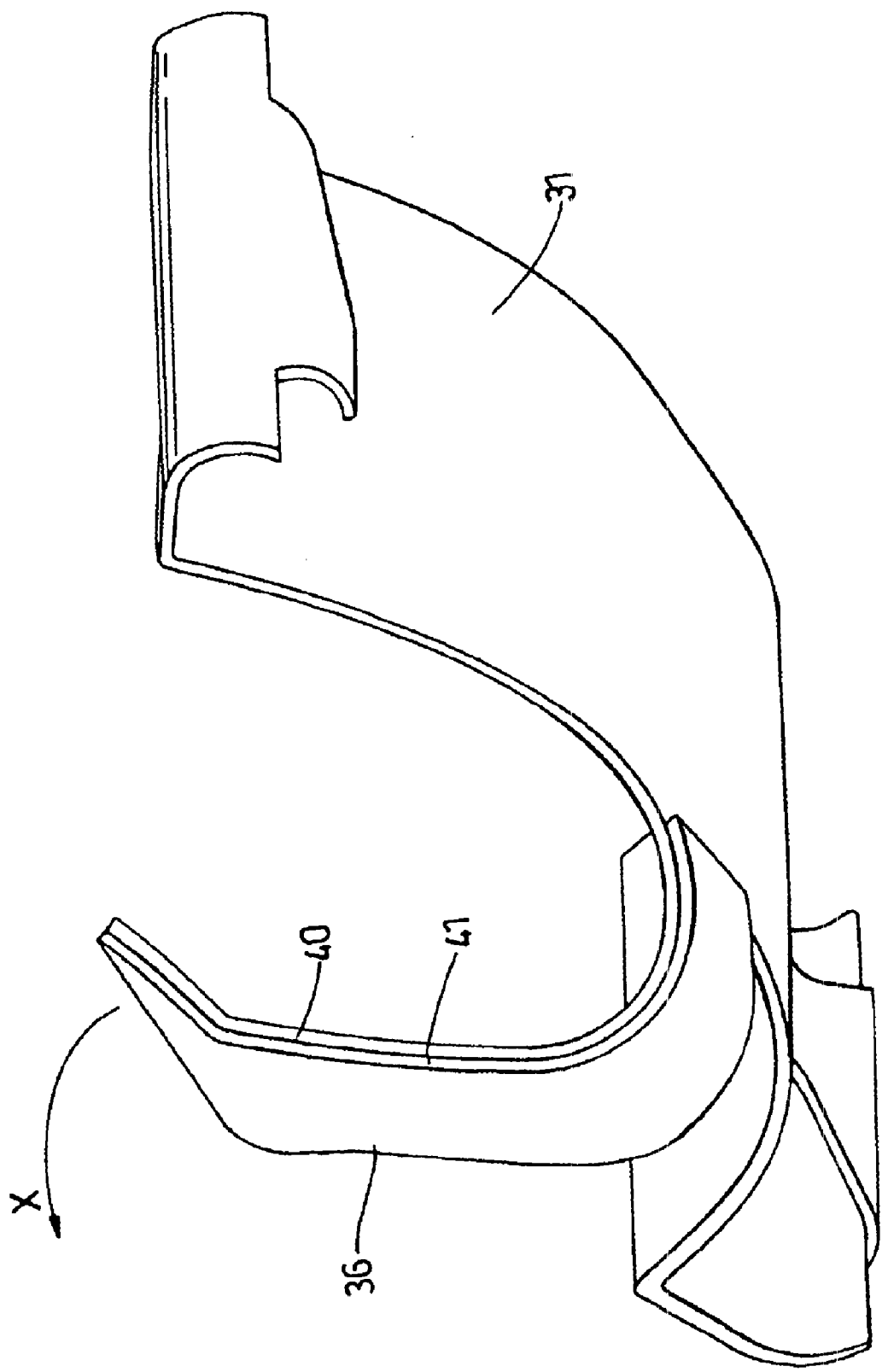
FIG. 3 is a perspective view of a spring and pawl used in the adjuster of FIG. 2.

This temperature sensitive mechanism may, for example, take the form of a bi-metal pawl 36 as shown in FIG. 3 in which the pawl comprises a first metal layer 40 which is the same metal as the remainder of the bow spring and a second metal layer 41 which extends only over the pawl element of the spring. With this type of construction when the bow spring heats up as a result of the general hot condition of the brake the pawl will tend to deflect to the left as shown by arrow X thus tending to disengage the gear wheel 35 and prevent over adjustment of the adjuster strut.

In an alternative construction both the bow spring 31 and the pawl 36 are of a two layer bi-metal construction so that both elements deflect on reaching a particular temperature range thus disengaging the pawl from the gear wheel 35. A further variant is possible in which only the bow spring 35 is of a two layer bi-metal construction and the pawl 36 is a single metal layer. Again in this construction the heating up of the bow spring will cause sufficient deflection of the bi-metal bow spring to disengage the pawl 36 from the gear wheel 35.

Figure 4:
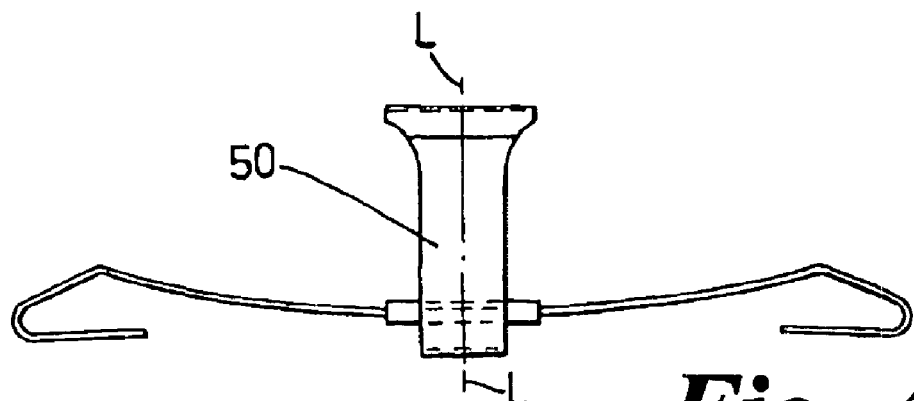
FIGS. 4 to 6 show a side view, plan view and a section on line L—L of a further form of spring and pawl for use in the adjuster of FIG. 2.
Figure 5:
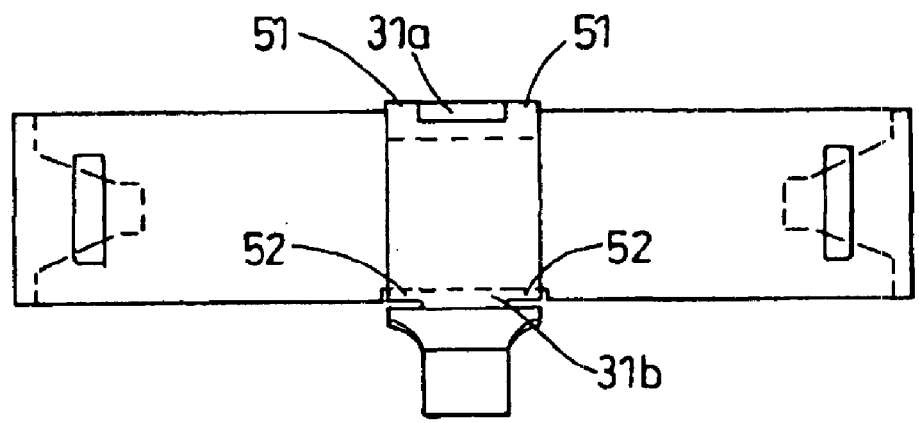
Figure 6:
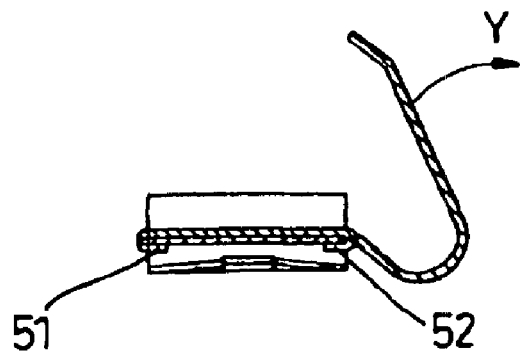

A yet still further alternative construction is shown in FIGS. 4 to 6 in which a separate bi-metal pawl member 50 is clipped around the edges of the bow spring 31. One edge of the bow spring has a projection 31a and the other edge of the bow spring has a recess 31b. Two prongs 51 straddle the projection 31a and are bent round the edge of the bow spring 31. The other side of the bow spring to further prongs 52 are bent into the ends of recess 31b thus retaining the pawl 50 mounted on the intermediate portion of the bow spring 31 in a fixed axial position. In accordance with the invention the pawl 50 is formed from a two layer bi-metal element so that the pawl will deflect to the right as shown by arrow Y in FIG. 6 if the brake overheats and will thus disengage the gear wheel 35.

The present invention therefore provides a brake adjuster which includes a bi-metal temperature sensitive mechanism for disengaging the pawl from the gear wheel if the adjuster becomes too hot thus preventing over adjustment of the associated drum brake. The bi-metal temperature sensitive mechanism constructions disclosed do not result in any significant impairing of the bow spring itself which can occur if stress concentrations are induced by, for example, riveting the pawl to the bow spring.

What is claimed is:

1. A brake adjuster for adjusting the working clearance of the shoes of an automotive drum brake, the adjuster including three co-axial elements:

a first rod element having a head portion for engagement with a first brake shoe and a threaded stem portion;

an intermediate element in threaded engagement with the first rod element;

a second rod element having a head portion for engagement with a second brake shoe and a stem portion slideably connected with the intermediate element and free to rotate relative thereto;

a reaction member mounted on the intermediate element;

a ring gear for rotation with the intermediate element and axially located between the second rod element and the reaction member;

a leaf spring acting between the second rod element and the reaction member for pushing the second rod element away from the intermediate element, said leaf spring carrying a pawl designed to engage the ring gear, and a temperature sensitive mechanism designed to prevent the ring gear rotating when the brake temperature exceeds a pre-set value;

the adjuster being characterised in that the temperature sensitive mechanism is provided by forming the pawl as a bimetallic laminate having flaps thereon which are folded around the edge of the spring and which engage recesses in the edge of the spring so that during a normal operation the pawl engages the ring gear to operate the adjuster and at temperatures above a pre-set value the pawl is deflected out of engagement with the ring gear to prevent adjustment.

* * * * *